A. J. ALLARD.
TRAIN CONTROLLING MEANS.
APPLICATION FILED DEC. 4, 1911. RENEWED JAN. 28, 1913.
1,060,404.
Patented Apr. 29, 1913.
2 SHEETS—SHEET 1.
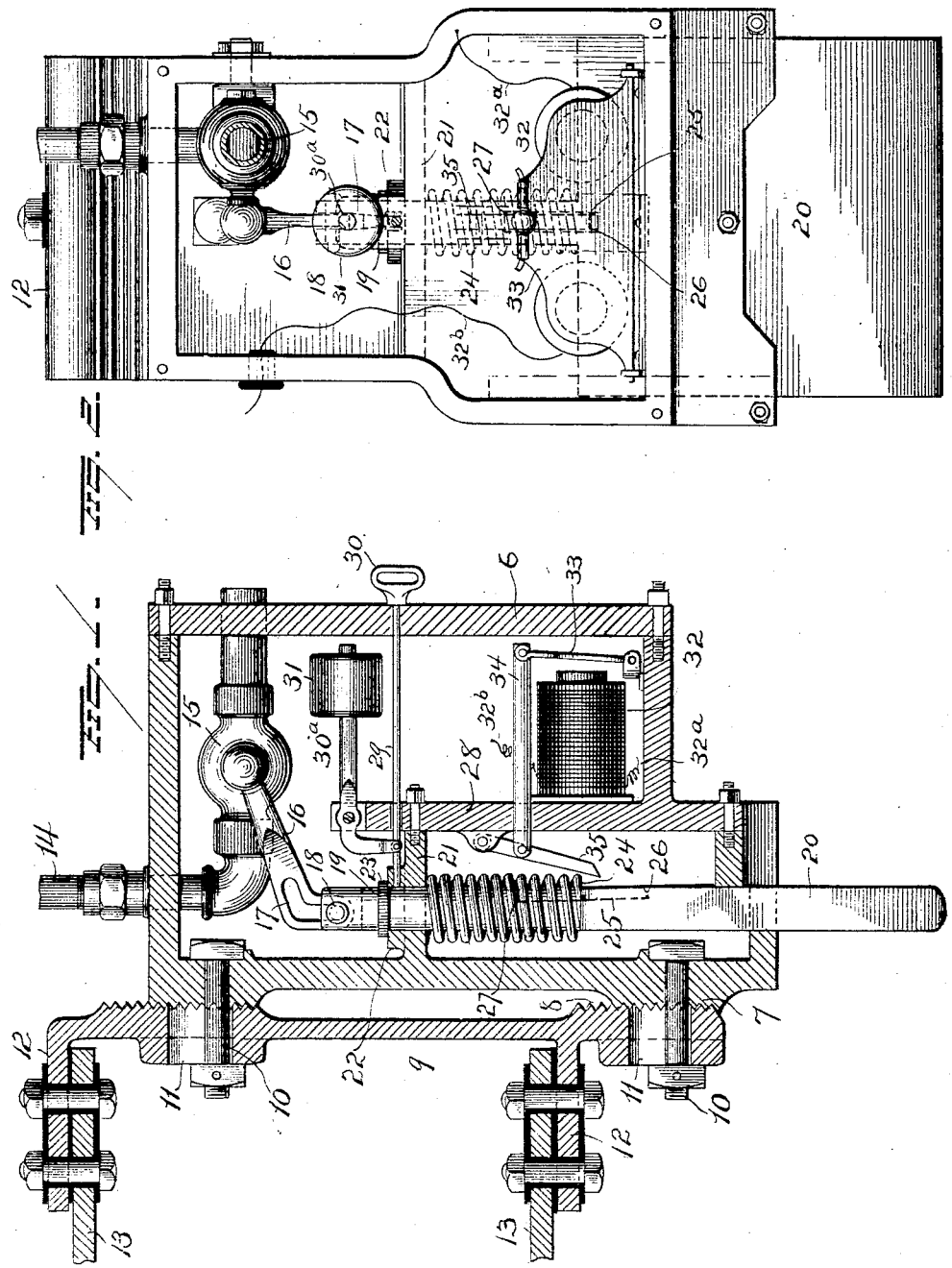

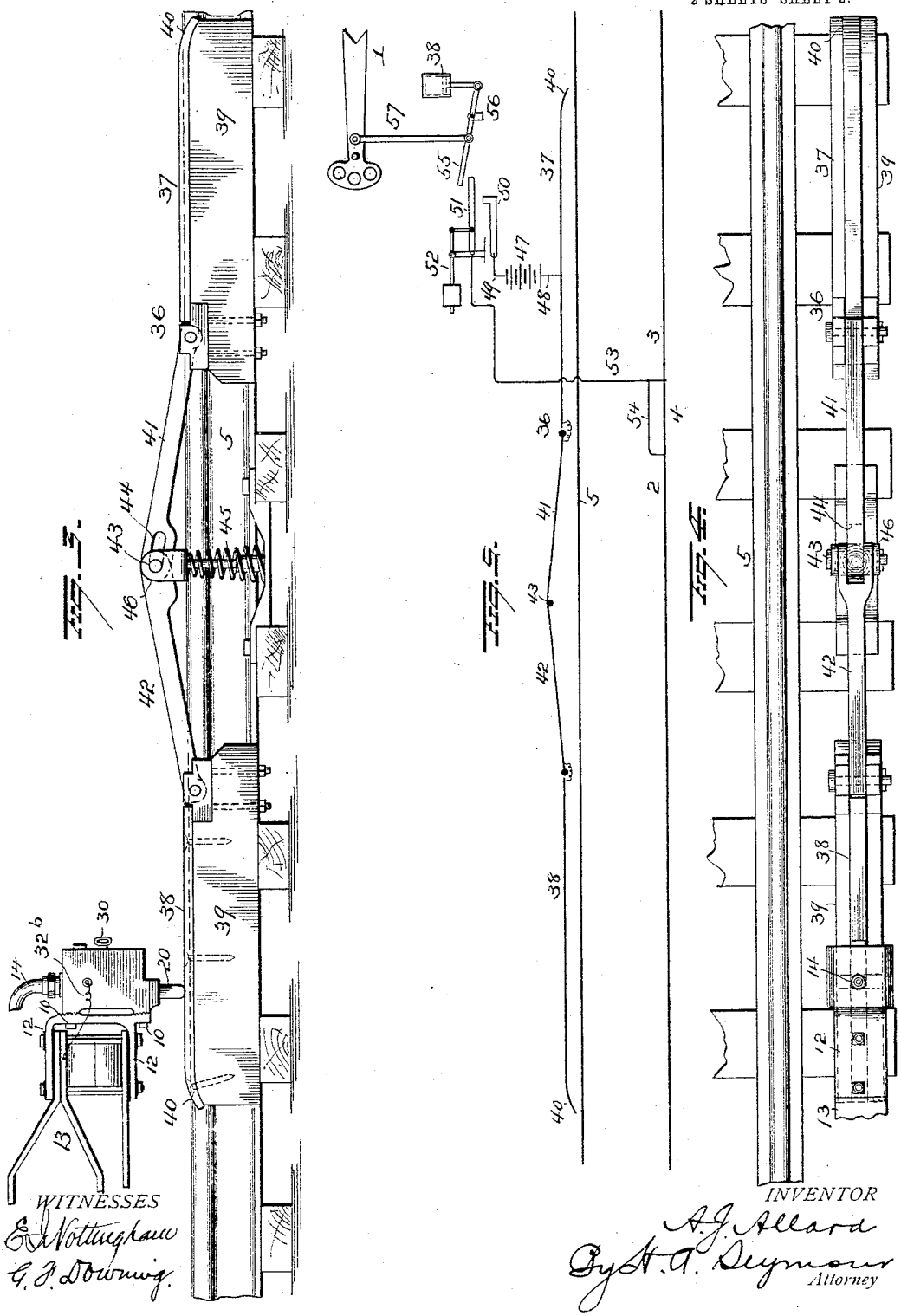

UNITED STATES PATENT OFFICE.

ANDREW J. ALLARD, OF RICHMOND, VIRGINIA, ASSIGNOR OF ONE-THIRD TO T. F. GREEN AND ONE-THIRD TO D. R. CREECY, JR., OF RICHMOND, VIRGINIA.

TRAIN-CONTROLLING MEANS.

1,060,404.   Specification of Letters Patent.   Patented Apr. 29, 1913.

Application filed December 4, 1911, Serial No. 663,744. Renewed January 28, 1913. Serial No. 744,786.

*To all whom it may concern:*

Be it known that I, ANDREW J. ALLARD, a citizen of the United States, residing at Richmond, in the county of Henrico and State of Virginia, have invented certain new and useful Improvements in Train-Controlling Means; and I do hereby declare the following to be a full, clear, and exact description of the invention, such as will enable others skilled in the art to which it appertains to make and use the same.

This invention relates to improvements in train controlling means, and more particularly to such as are adaptable for use in a block signaling system.

One object of my present invention is to provide means controlled by the position of a semaphore block signal for causing the automatic stopping of a train when a semaphore is set at danger.

A further object is to provide means for automatically stopping a train if the engineer ignores a danger signal located at the side of the road at a block intersection, switch, bridge, curve or other danger point along the line of railroad.

With these and other objects in view, the invention consists in certain novel features of construction and combinations of parts as hereinafter set forth and pointed out in the claims.

In the accompanying drawings, Figure 1 is a sectional view showing the instrument carried by the rolling equipment; Fig. 2 is an elevation taken at right angles to Fig. 1 with front of the casing removed; Fig. 3 is a view showing the track instrument and also the relation thereto of the instrument on the rolling equipment. Fig. 4 is a plan view showing the track instrument and the relation of the same to the track rail, and Fig. 5 is a diagrammatical view.

In describing my improvements, I will assume that the semaphore signal blade 1 is located at the intersection of two blocks. In the diagram Fig. 5, track rails 2—3 of adjacent blocks are insulated from each other at 4 while the track rail 5 may be continuous.

The instrument carried by the rolling equipment comprises a metal box or casing 6 in which the operating devices are inclosed, and this box is provided on its back with serrated portions 7 to engage serrated portions 8 of a bracket 9, the box being secured to the bracket by means of bolts 10 passing through the back wall of the box and through elongated slots 11 in the bracket. The instrument is thus supported by the bracket in a manner to permit vertical adjustment of the same relatively to a track instrument hereinafter described. The bracket 9 is made with arms 12 which are secured to but insulated from the truck frame 13 of the rolling equipment. This may be one of the truck frames of the locomotive tender.

The equalizer pipe 14 of the air brake system passes through the box or casing 6 and is provided, in the latter, with a valve 15. An arm 16 is secured to the stem of valve 15 and is provided in its free angular end, with an angular slot 17 for the passage of a pin 18 whereby said arm is loosely connected with the shank 19 of a shoe 20. The shank 19 is guided through an opening in a horizontal partition 21 and a collar 22 on said partition, and is provided with an annular flange 23 to rest on said collar and thus limit the downward movement of the shoe 20. The shoe is guided through an elongated slot in the bottom of the box or casing and its vertical movement is resisted by a spring 24 which encircles the shank 19,—said spring bearing at its lower end against the top of the shoe and at its upper end against the partition 21. The shank of the shoe is made with a vertical groove 25, forming a lower shoulder 26 and an upper shoulder 27.

The box or casing 6 is provided therein with a vertical wall or partition 28, through an opening in which a horizontal rod 29 passes. This rod also passes through the annular flange 22 so as to engage the shank 19 of the shoe 20 and is of sufficient length to also pass through the front wall of the box or casing 6,—outside of which latter, said rod is provided with a handle 30. An L-shaped lever 30ᵃ is mounted at the upper end of the partition 28 and has its depending arm pivotally connected with the rod 29,—the horizontal arm of this lever being provided with a weight 31. The weighted lever 30ᵃ acts to normally press the rod 29 toward the shank 19 of the shoe so that when the shoe is raised (as hereinafter explained) to open the equalizer valve 15 for applying the train brakes, the end of said rod will engage the upper shoulder 27 of the shank 19, and thus lock said valve open,—thus necessitating the manual operation of the rod 29 by the trainman, to permit the descent of the shoe and the consequent closing of the equalizer valve. The vertical partition 28 also supports an electro-magnet 32,—in front of which, an armature 33 is pivotally supported at its lower end. The upper end of the armature 33 is connected with one end of a rod 34 which is freely movable through an opening in the vertical partition 28 and connected with a latch 35. This latch is pivotally attached at its upper end to the partition 28 and its weight is sufficient to cause it to normally hang with its lower end out of alinement with the lower shoulder 26 of the shank 19 and to hold the armature 33 away from the magnet 32 when the latter is not energized. When the magnet is energized, however, the movement of armature 33 toward the magnet, will be transmitted through the rod 34 to the latch 35, so as to dispose the lower end of the latter in position to be engaged by the shoulder 26 and thus prevent sufficient upward movement of the shoe 20 to operate the valve 15. One terminal of the coil of magnet 32 is connected by a conductor 32$^a$ with the casing 6, and the other terminal of said coil is connected by a conductor 32$^b$ with the truck 13.

When "safety" conditions exist on the road at a block intersection, the magnet 32 will be energized (as hereinafter explained) when a train passes from one block to another so as to prevent the operation of the equalizer valve, and thus prevent the application of the brakes when it is safe for a train to proceed.

Located in proximity to the track rail 5, near a block signal 1, is a track instrument 36 to coöperate with the shoe 20 of the instrument on the rolling equipment. This track instrument may, as a whole, be from two to three hundred feet (more or less) in length and comprises two fixed rails 37—38 supported on timbers 39 and having their upper faces in a plane slightly above that of the tread of track rail 5 and having their outer ends curved downwardly as at 40 to facilitate the riding of the shoe 20 onto the same, and said track instrument also comprises two intermediate sections 41—42 hinged at the inner ends of the contact rails 37—38 and pivotally connected at their inner ends by means of a pin 43, the section 41 having an elongated slot 44 for the passage of said pin, whereby said sections 41—42 can be depressed against the resistance of a spring 45 which bears against a yoke 46 in which the inner ends of the rail sections 41—42 are pivotally connected.

Near the block signal 1, a battery 47 is located and one terminal of this battery is connected, by a conductor 48, with the track instrument 36. The other terminal of the battery 47 is connected by a conductor 49 with a fixed switch arm 50. A pivoted switch arm 51 is adapted to coöperate with the switch arm 50 and is held normally out of engagement therewith (as shown in Fig. 5), by means of a weighted lever 52. The movable arm 51 of the switch is connected, by means of conductors 53—54, with the track rails 2—3. A lever 55 is pivoted to a support 56 near the signal blade 1 and is connected with the latter by means of a rod 57. One end of the lever 55 is in position to engage the switch arm 51 and move it into contact with switch arm 50 to close the circuit of battery when the signal blade moves from "danger" position shown in Fig. 5, to "safety" position. The other end of the lever 55 is connected with the plunger of an air pot 58 for cushioning the movements of the lever.

Assuming that the signal blade 1 of the block signaling system is at "safety,"—the switch arm 51 will be in contact with the switch arm 50, and the battery 47 will therefore be connected with the rail sections 2—3. Should a train now arrive at this block intersection, (from either direction) contact of the shoe 20 with the track-instrument rails or sections 37 or 38, a circuit would be established, as follows: from battery 47, by conductor 48 to track instrument 36, to shoe 20, to box or casing 6; then by conductor 32$^a$ to magnet 32; then by conductor 32$^b$, to truck 13, to rail section 2 or 3; then by conductor 53 to switch arm 51 to switch arm 50 to battery 47. The effect of this circuit will be to energize the magnet 32 and cause it to move the latch 35 in the path of the shoulder 26, and thus prevent the shoe 20 being raised sufficiently by the track instrument to operate the valve 15, the track instrument, in such case, yielding downwardly. The train can, therefore, pass without having its brakes applied.

Suppose now that the signal blade has been raised to "danger" position as shown in Fig. 5 by reason of the presence in the block, of a train. Under such conditions, the circuit of the battery 47 will be open at 50—51. The shoe 20 on a second train now arriving at the signal station, would not, by contact with the track instrument, close the circuit of battery 47 through the magnet 32, as above explained, and hence the latch 35 will be out of alinement with the shoulder 26 of the shank of the shoe. As the second train proceeds, its shoe 20 will be forced upwardly by the intermediate sections 41—42 of the track instrument and motion will be transmitted, through the arm 16 to valve 15 to open the latter and cause the automatic setting of the air brakes and the stopping of the train. The valve will be locked in such open position by engagement of the rod 29 with the upper shoulder 27 on the shank of the shoe. To unlock the valve and permit the parts to return to their normal positions, the trainman must leave the cab and pull the rod 29,—whereupon the valve will be closed and the parts returned to normal position by the action of the spring 24.

It is apparent that with my improvements, a train cannot pass a danger signal without having the brakes of the train applied automatically.

It is apparent that various changes might be made in the details of construction of my invention without departing from the spirit thereof or limiting its scope, and hence I do not wish to restrict myself to the precise details herein set forth.

Having fully described my invention, what I claim as new and desire to secure by Letters-Patent, is:—

1. In train controlling means, the combination with rolling equipment, a controlling valve on the rolling equipment, a track and a block signal, of a vertically movable shoe carried by the rolling equipment and connected with said valve, a track instrument for moving said shoe upwardly, a latch for restricting the upward movement of said shoe, electro-magnetic means for moving said latch to position to coöperate with the shoe, and means controlled by the block signal for controlling said electro-magnetic means to control the position of the latch.

2. In train controlling means, the combination with rolling equipment, a controlling valve thereon, a track and a block signal, of a vertically movable shoe on the rolling equipment, an arm on the valve and having lost-motion connection with the shoe, a spring normally pressing said shoe downwardly, a track instrument for raising the shoe, a latch to limit the upward movement of the shoe and prevent operation of the valve, an electro-magnet, connections between the armature of said magnet and said latch whereby said latch will be out of coöperative relation to the shoe when the magnet is not energized, a partial circuit including said magnet, shoe and rolling equipment, a partial electric circuit including a rail of the track, the track instrument and a battery, a switch in said last mentioned circuit, means connected with the signal for closing said switch when the signal moves to "safety," and means for opening said switch when the signal moves to "danger."

3. In a train controlling means, the combination with rolling equipment, a block signal, and track rails, of a box or casing, means securing said box or casing to a truck of the rolling equipment, a train controlling valve in said box or casing, a vertically movable shoe carried by the box or casing, means connecting said shoe with the valve, a track instrument for moving said shoe upwardly, electro-magnetically controlled means for limiting the upward movement of the shoe to prevent the operation of the valve, a partial circuit including the magnets of said electro-magnetically controlled means, the shoe and the truck frame, a partial circuit including a battery, a switch, a track rail and the track instrument, and means controlled by the blade of the block signal to close said switch when the signal moves to "safety" position.

In testimony whereof, I have signed this specification in the presence of two subscribing witnesses.

ANDREW J. ALLARD.

Witnesses:
M. J. NUCKOLS,
WM. P. REDD.